No. 636,010. Patented Oct. 31, 1899.
H. W. SMOUSE.
SAUSAGE STUFFING MACHINE.
(Application filed Apr. 24, 1899.)
(No Model.) 2 Sheets—Sheet 2.
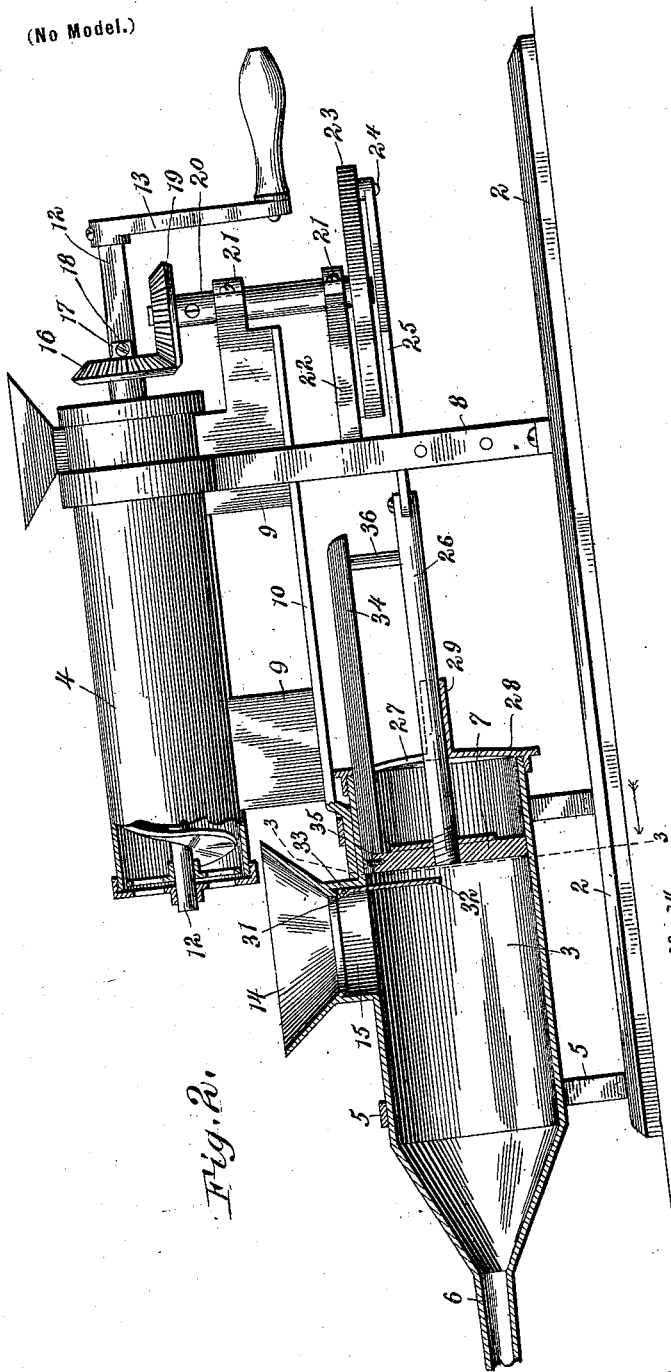
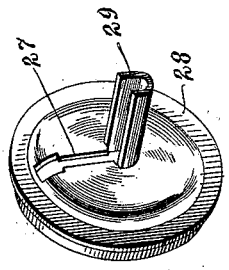
Fig. 4.
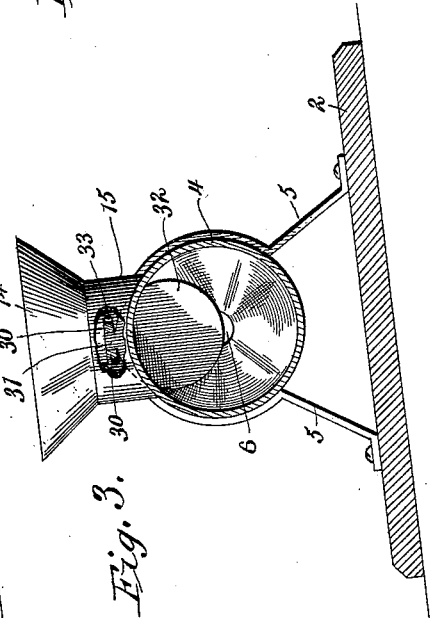
Fig. 3.
Witnesses
Howard D. Orr
Heath Sutherland
H. W. Smouse, Inventor
By his Attorneys,
C. A. Snow & Co.

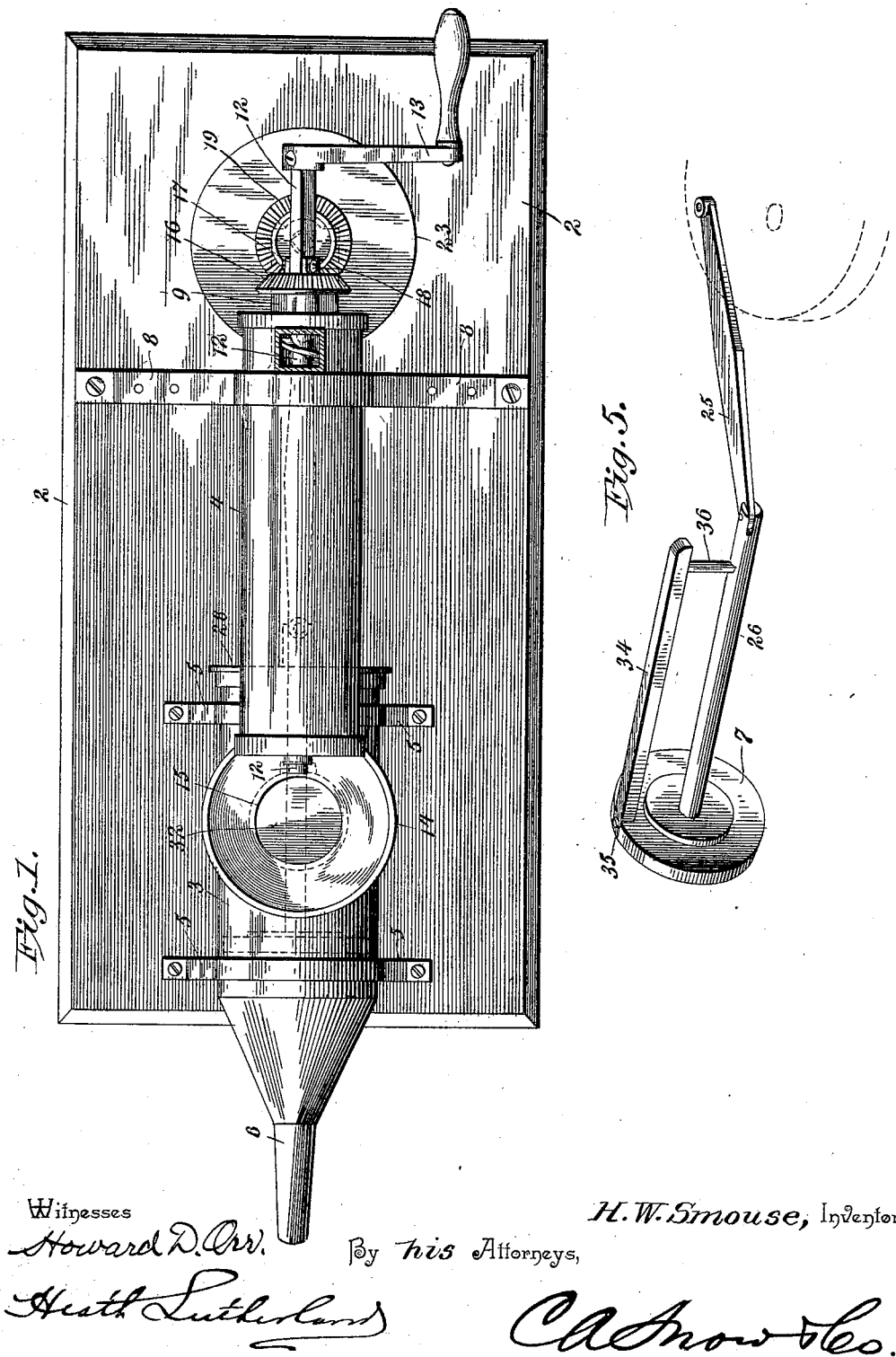

UNITED STATES PATENT OFFICE.

HUGH W. SMOUSE, OF ROWLESBURG, WEST VIRGINIA.

SAUSAGE-STUFFING MACHINE.

SPECIFICATION forming part of Letters Patent No. 636,010, dated October 31, 1899.

Application filed April 24, 1899. Serial No. 714,202. (No model.)

*To all whom it may concern:*

Be it known that I, HUGH W. SMOUSE, a citizen of the United States, residing at Rowlesburg, in the county of Preston and State of West Virginia, have invented a new and useful Sausage-Stuffing Machine, of which the following is a specification.

This invention relates to a machine intended, primarily, for stuffing sausages, although, of course, it can be employed for substantially similar purposes; and the object of the invention is to provide a simple and efficient device of this character so constructed as to automatically control the supply of ground substance from the grinding mechanism to the stuffing device. The apparatus includes in its organization grinding and stuffing mechanisms, both of which may be of the construction common in this art, and the stuffing mechanism involves a nozzle over which the casing or analogous article is drawn or stretched, and it is provided with a cut-off, and means are provided for automatically operating the cut-off when the plunger reaches a predetermined point in its advancing stroke, thereby positively preventing the entrance of material back of the plunger. In the present case the means which operate the cut-off are controlled by the plunger, thereby absolutely securing the proper action of the former at the correct time.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a top plan view of a sausage-stuffing machine constructed in accordance with my invention and showing the cut-off as being in its closed position and representing by dotted lines the plunger and the cut-off-operating device in their extreme advanced positions. Fig. 2 is a side elevation of the same, the stuffing-cylinder being in longitudinal central section and the-cut-off being open and the plunger and other parts being shown in their extreme rear positions. Fig. 3 is a transverse section through the stuffing mechanism, the section being taken just in advance of the supply-chute. Fig. 4 is a perspective view of the detachable cap. Fig. 5 is a similar view of the plunger and the cut-off-operating device, together with certain other connections, and also showing the driving device for the plunger.

Like characters denote like and corresponding parts in each of the several figures of the drawings.

The different parts of the machine may be supported in any convenient manner—that is, they may be either removably or permanently attached to a table or like support; but in the present case they are represented as being sustained by the base 2.

The apparatus includes grinding and stuffing devices, which may be of the kind familiar in this art and both of which include cylindrical casings disposed in parallelism and located one above and slightly behind the other. The lower casing is denoted by 3 and the upper casing by 4, and the former is provided with a series of depending legs 5, which may be secured in some suitable manner to the base 2, and it also has a tapered forward end, to which the nozzle 6 is joined, the casing being stretched around said nozzle to receive the charge of ground meat, which is forced thereinto by the plunger 7.

The props or side standards 8 are secured to the base 2 and also to the rear end of the upper or grinding casing 4, said casing being in turn supported by the blocks or bearings 9 at opposite ends thereof, which are fixed to the longitudinal projection or bracket 10, secured to and extending rearward from the plunger-casing 3.

The upper casing 4 incloses the shaft 12, which is provided with the customary grinding or feed screw, and it is also equipped with the crank 13 at its extreme rear end, which can be secured thereto in some suitable manner and the handle of which is operated by the attachment, so as to effect the grinding of the meat and the forcing of the same into the approximately funnel-shaped hopper or chute 14. The meat falls from the casing 4 into the hopper or chute 14, secured to the upper side of the casing 3 and the discharge end of which registers with the substantially circular supply-openings 15 in said part 3.

The shaft 12 near its back end is squared to receive the bevel-gear 16, which fits against a shoulder on said shaft. The gear 16 is provided with a projection 17, adapted to receive the set-screw 18, which is in threaded engagement with the squared end of the shaft and which serves to hold the gear against endwise movement. By taking out the set-screw the gear can be slipped off the shaft, thereby to permit the removal of the latter and the feed-screw carried thereby, so that these parts can be cleaned of adhering particles of meat and dirt. The bevel-gear 16 meshes with a coöperating bevel-gear 19, secured to the vertical shaft 20, which is supported by bearing-boxes 21, secured, respectively, to one of the blocks 9 and to the horizontal shelf or bracket 22, fixed at its opposite ends to the angularly-disposed props or standards 8. The bevel-gear 19 is likewise detachably secured to its shaft 20, so that it can be removed when occasion requires to clean the same.

The shaft 20 is provided at its lower end with the wheel or disk 23, which may be fixed thereto in some suitable manner and which is provided with the crank-pin 24, located near the periphery thereof and connected with the pitman or rod 25, which is pivoted at its opposite end to the rod 26. The rod is secured at its opposite end centrally to the plunger 7, to which I have previously referred, and which consists, preferably, of a disk snugly fitted within the casing 3 and adapted to push the ground material received through the supply-opening 15 into a casing stretched over the nozzle 6, and for the purpose of preventing the entrance of any of the substance back of the plunger I provide a cut-off controlling the supply-opening and means for automatically operating the same at the proper point, so as to block the passage of material into the lower casing. The plunger on the rotation of the wheel or disk 23 is reciprocated through the intermediate connections, and its rod extends through the vertical slot or opening 27 in the removable cap or cover 28, which is fitted in the rear of the casing, and said slot or opening is made sufficiently wide near its ends as to permit the lateral motion of the rod and of a cut-off-operating device, hereinafter specified, on the reciprocation of said parts. The rod is maintained in a horizontal position throughout its travel by the guide 29, which is trough-shaped or semicircular in cross-section and which is secured to and extends rearward from the cap 28, near the opening therein, and which is adapted to support the rod.

The supply-chute 14 has ears 30, between which the lug 31, extending from the cut-off 32, is received, and the pivot-bolt 33 extends through the lug and the ears. The cut-off is represented as consisting of a circular flat plate adapted when shut to cover or close the supply-opening 15, so that any material which may be discharged from the casing 4 will strike the same, but will not enter the casing 3, the plunger of which at this moment is in its forward position. In this construction no material can get behind the plunger to accumulate between its rear face and the removable cap 28. The cut-off is in the nature of a gravitative one—that is, it opens by its own weight, but it is closed automatically by an actuating device controlled by the plunger. The actuating device for the cut-off is represented as consisting of a longitudinal bar 34 in parallelism with the rod 26 and which is secured in a peripheral notch 35 in the plunger and the rear end of which is maintained at the proper distance from the said rod by means of the transverse brace 36, secured, respectively, to said parts. When the plunger is in its rearward position, the valve will be open or down, and as said plunger is moved forward the bar 34 will be carried therewith, and by engaging the valve or cut-off, which is disposed in its path, said cut-off or valve will be swung up or closed during such stroke and will be tightly held in such position by such bar, and the latter will be made long enough to maintain the valve or cut-off shut during the time the plunger is traveling toward its extreme forward position. On the rear movement of the plunger the bar will be drawn back and when it reaches a certain position will pass out of contact with the valve or cut-off, so that the same can drop, and thereby permit the entrance of further material into the casing, which material is thrust forward on the working stroke of the plunger.

The apparatus constructed as hereinbefore set forth is simple in construction and easy in operation, and the requisite quantity of material will be supplied to the casings and without any of the material passing behind the plunger, as in such case it accumulates in this space to such an extent as to affect the proper operation of said plunger.

Changes in the form, proportion, size, and the minor details of construction within the scope of the appended claims may be resorted to without departing from the spirit or sacrificing any of the advantages of this invention.

Having thus described the invention, what I claim is—

1. In a machine of the class described, the combination of a casing having a feed-opening, a plunger operating within the casing and capable of longitudinal reciprocation, and a cut-off located at the feed-opening and mounted independently of the plunger and adapted to open automatically to permit the material to enter the casing, said cut-off, when open, being arranged in the path of the plunger and adapted to be directly engaged and closed by the same when the said plunger moves forward, substantially as described.

2. In a machine of the class described, the combination of a casing, a reciprocating plunger mounted in the casing, an automatically-opening cut-off arranged in the path of and adapted to be closed by the plunger, and a longitudinal bar carried by the plunger and arranged to support the cut-off in its closed position while the plunger is in advance of the same, substantially as described.

3. In a machine of the class described, the combination of a casing, a plunger, a cut-off hingedly mounted, adapted to open automatically and located in the path of and adapted to be closed by the plunger, and a longitudinal bar carried by the plunger and arranged to support the cut-off in its closed position when the plunger is in advance of the same, substantially as described.

4. In a machine of the class described, the combination of a casing provided at its top with a supply-opening, a plunger operating in the casing, a hinged cut-off adapted to open automatically and arranged in the path of the plunger so as to be closed by the same, a bar extending longitudinally of the plunger and arranged to support the cut-off in its closed position while the plunger is in advance of the same, and a second casing located above the said opening and provided with grinding and feeding devices and adapted to supply material to the first-mentioned casing, substantially as described.

5. In a machine of the class specified, the combination with a casing having a plunger therein and having a detachable slotted cap closing the rear end thereof, of a second casing provided with a grinding and feeding device and located to supply material to the first-mentioned casing, a cut-off operable to regulate the supply, a rod secured to the plunger and extending through the slot in said plate, a bar also secured to the plunger and also extending through said slot and constituting an actuating device for said cut-off, and means for reciprocating said rod, substantially as described.

6. In a machine of the class specified, the combination with a casing having a plunger therein and having a detachable slotted cap closing the rear end thereof, of a second casing provided with a grinding and feeding device and located to supply material to the first-mentioned casing, a cut-off operable to regulate the supply, a rod secured to the plunger and extending through the slot in said plate, a bar also secured to the plunger and also extending through said slot and constituting an actuating device for said cut-off, a trough-shaped guide secured to and extending rearward from said plate and constituting a support for said rod, and means for operating the rod and said grinding and feeding device, substantially as described.

7. In a machine of the class described, the combination of a casing provided at its top with a feed-opening, a horizontal plunger operating within the casing and arranged to reciprocate longitudinally, and a hinged cut-off mounted at one side of the feed-opening independently of the plunger, and adapted to swing open automatically to permit the material to enter the casing, said cut-off when open being arranged in the path of the plunger and adapted to be directly engaged and closed by the same when the said plunger moves forward, substantially as described.

8. In a machine of the class described, the combination of a horizontal casing provided at its top with a feed-opening, a horizontally-reciprocating plunger operating within the casing, a cut-off hinged at one side of the feed-opening and arranged to swing downward into the casing to permit material to enter the same, said cut-off when open, being arranged within the path of the plunger and adapted to be directly engaged and closed by the same when the said plunger moves forward, and means carried by the plunger for holding the cut-off in its closed position when the said plunger is in advance of the feed-opening, substantially as described.

In testimony that I claim the foregoing as my own I have hereto affixed my signature in the presence of two witnesses.

HUGH W. SMOUSE.

Witnesses:
   HARRY R. HOLLIS,
   GEORGE M. PUGH.